United States Patent
Yang et al.

(10) Patent No.: US 12,120,689 B2
(45) Date of Patent: Oct. 15, 2024

(54) MULTIPLEXING OF UPLINK CONTROL INFORMATION

(71) Applicant: Apple Inc., Cupertino, CA (US)

(72) Inventors: Weidong Yang, San Diego, CA (US); Oghenekome Oteri, San Diego, CA (US); Chunhai Yao, Beijing (CN); Chunxuan Ye, San Diego, CA (US); Dawei Zhang, Saratoga, CA (US); Haitong Sun, Cupertino, CA (US); Hong He, San Jose, CA (US); Huaning Niu, San Jose, CA (US); Seyed Ali Akbar Fakoorian, San Diego, CA (US); Sigen Ye, San Diego, CA (US); Wei Zeng, Saratoga, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 242 days.

(21) Appl. No.: 17/776,737

(22) PCT Filed: Sep. 24, 2021

(86) PCT No.: PCT/CN2021/120501
§ 371 (c)(1),
(2) Date: May 13, 2022

(87) PCT Pub. No.: WO2023/044831
PCT Pub. Date: Mar. 30, 2023

(65) Prior Publication Data
US 2023/0284223 A1 Sep. 7, 2023

(51) Int. Cl.
*H04W 72/21* (2023.01)
*H04W 72/0446* (2023.01)
*H04W 72/563* (2023.01)

(52) U.S. Cl.
CPC ....... *H04W 72/21* (2023.01); *H04W 72/0446* (2013.01); *H04W 72/563* (2023.01)

(58) Field of Classification Search
CPC ............. H04W 72/21; H04W 72/0446; H04W 72/563; H04W 72/20; H04W 72/566; H04W 72/00; H04W 72/1268
See application file for complete search history.

(56) References Cited

U.S. PATENT DOCUMENTS 11,570,786 B2 * 1/2023 Lin ...................... H04L 5/0044
11,832,254 B2 * 11/2023 Papasakellariou ..........................
H04W 72/1263

(Continued)

FOREIGN PATENT DOCUMENTS

| CN | 111418179 A | 7/2020 |
|----|-------------|--------|
| EP | 3694134 | 8/2020 |
| WO | 2021022519 A1 | 2/2021 |

OTHER PUBLICATIONS

Extended European Search Report for EP Patent Application No. 21899291.5; 16 pages; Oct. 11, 2022.

(Continued)

*Primary Examiner* — Rasheed Gidado
(74) *Attorney, Agent, or Firm* — Kowert, Hood, Munyon, Rankin & Goetzel, P.C.

(57) ABSTRACT

Methods and devices for a UE to multiplex uplink control information (UCI). The UE establishes a connection with a base station. The UE determines whether to multiplex first UCI by first identifying whether intra-priority timing overlap exists between the timing resources of the first UCI and a PUSCH with the same priority. Subsequently, the UE identifies whether inter-priority timing overlap exists between the timing resources of the first UCI and a second PUCCH with a different priority from the first PUCCH. Finally, the UE identifies whether the timing resources of the (Continued)

first UCI overlap with a second PUSCH with a different priority than the first PUCCH. The UE multiplexes the first UCI based on the determination whether to multiplex the first UCI, and transmits the multiplexed first UCI to the base station.

20 Claims, 11 Drawing Sheets

(56) References Cited

U.S. PATENT DOCUMENTS

| | | | |
|---|---|---|---|
| 11,844,104 B2* | 12/2023 | Yang | ............ H04L 1/1858 |
| 2019/0261361 A1 | 8/2019 | Xiong et al. | |
| 2020/0314900 A1 | 10/2020 | Hosseini et al. | |
| 2021/0037555 A1 | 2/2021 | Papasakellariou | |
| 2021/0068195 A1 | 3/2021 | Yang et al. | |
| 2021/0105796 A1 | 4/2021 | Yang et al. | |
| 2024/0064743 A1* | 2/2024 | Si | ............ H04W 72/1268 |

OTHER PUBLICATIONS

Moderator (OPPO) "Summary of email thread [100b-e-NR-L1enh_URLLC-UCI_Enh-01]"; 3GPP TSG RAN WG1 #100b-e R1-2002783; 19 pages; Jul. 20, 2020.
Moderator (VIVO) "Summary of the Remaining Issues on intra-UE prioritization/multiplexing and eCG"; 3GPP TSG RAN WG1 #104bis-e R1-2103810; 11 pages; Apr. 12, 2021.
International Search Report for PCT/CN2021/120501; 9 pages; Sep. 24, 2021.
ZTE "Remaining issues on intra-UE multiplexing in Rel-16 URLLC"; 3GPP TSG RAN WG1 e-Meeting #104b-e R1-2102487; 5 pages; Apr. 12-20, 2021.

* cited by examiner

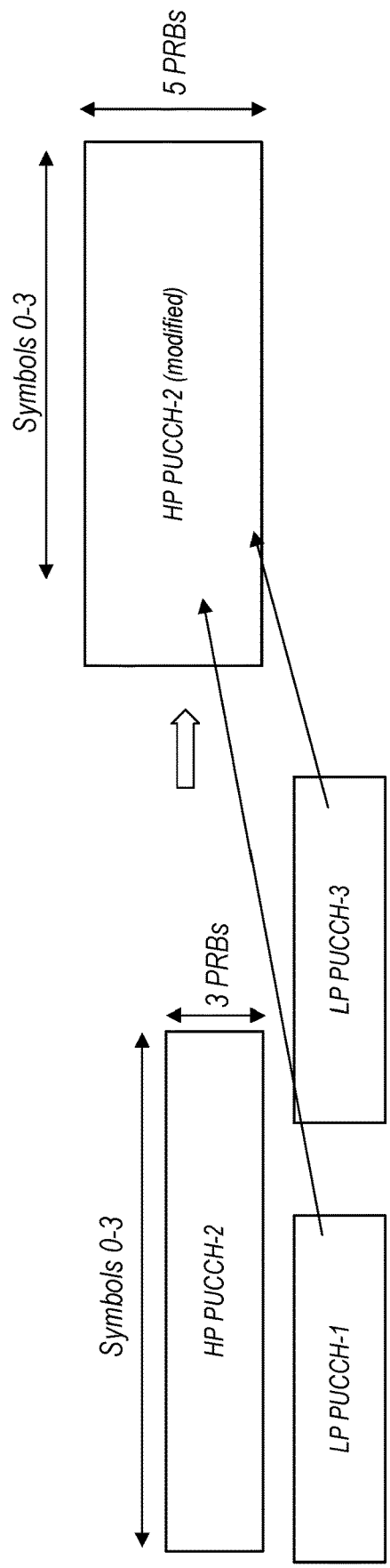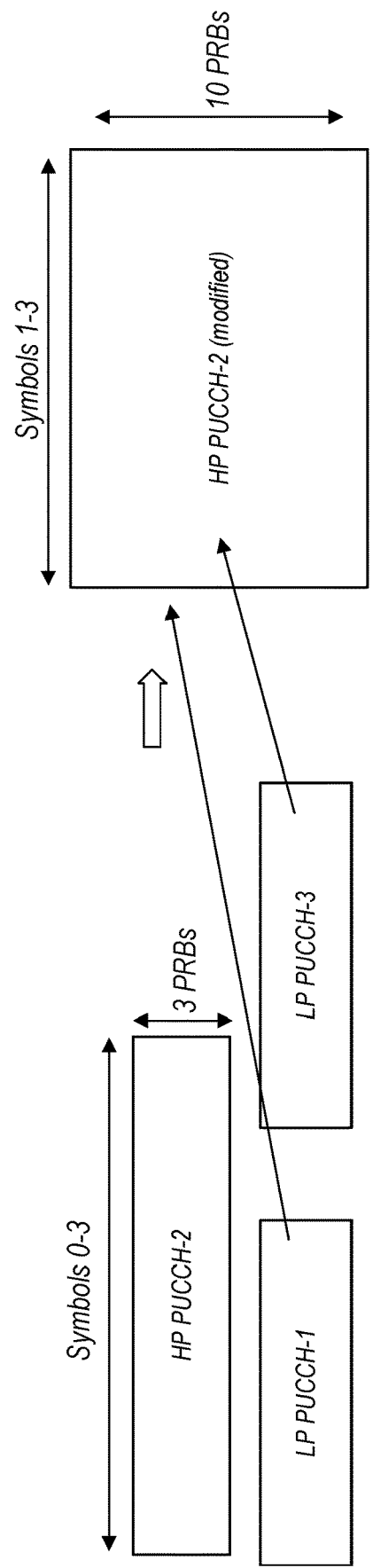

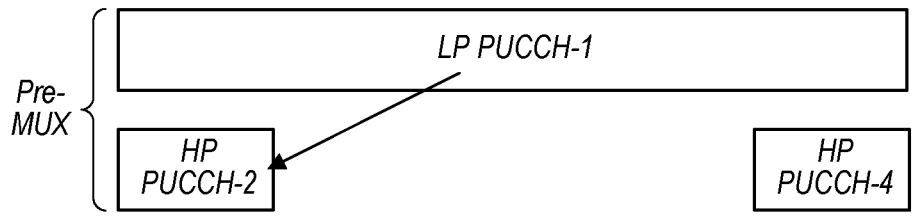
FIG. 12A
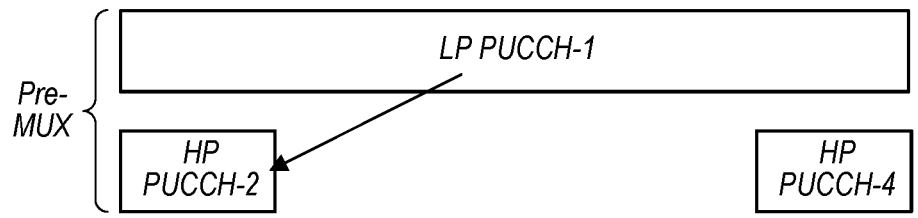
FIG. 12B
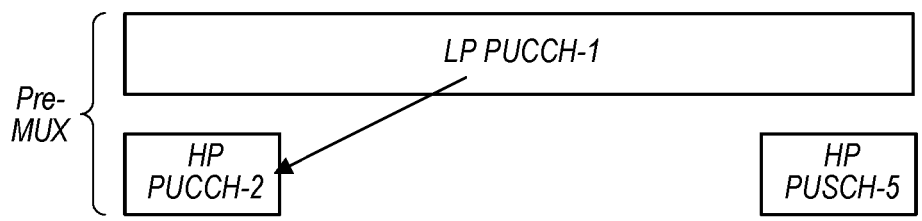
FIG. 13

MULTIPLEXING OF UPLINK CONTROL INFORMATION

PRIORITY CLAIM

This application is a national phase entry of PCT application number PCT/CN2021/120501, entitled "Multiplexing of Uplink Control Information," filed Sep. 24, 2021, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

The present application relates to wireless communication, including multiplexing of uplink control information.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost, low-complexity wireless devices intended for stationary or nomadic deployment are also proliferating as part of the developing "Internet of Things". In other words, there is an increasingly wide range of desired device complexities, capabilities, traffic patterns, and other characteristics. In general, it would be desirable to recognize and provide improved support for a broad range of desired wireless communication characteristics. One characteristic may be multiplexing of uplink control information. Improvements in the field are desired.

SUMMARY

Embodiments are presented herein of, inter alia, systems, apparatuses, and methods for scheduling multiplexing of uplink control information in a wireless communication system, e.g., New Radio (NR).

In some embodiments, a user equipment (UE) establishes a connection with a base station, and determines whether and how to multiplex uplink control information (UCI) for the base station.

In some embodiments, the UE determines whether to multiplex first UCI by identifying whether intra-priority timing overlap exists between the timing resources of the first UCI and a PUSCH with the same priority.

Subsequently, the UE may identify whether inter-priority timing overlap exists between the timing resources of the first UCI and a second PUCCH with a different priority from the first PUCCH.

Finally, the UE may identify whether the timing resources of the first UCI overlap with a second PUSCH with a different priority than the first PUCCH.

In some embodiments, the UE multiplexes the first UCI based on the identified overlap(s), and transmits the multiplexed UCI to the base station.

The techniques described herein may be implemented in and/or used with a number of different types of devices, including but not limited to mobile telephones or smart phones (e.g., iPhone™, Android™-based phones), tablet computers (e.g., iPad™, Samsung Galaxy™) portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, vehicle, automobile, unmanned aerial vehicles (e.g., drones) and unmanned aerial controllers, other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIGS. 10A-B are schematic illustrations of multiplexing low priority PUCCHs within a modified high priority PUCCH, according to some embodiments;

FIGS. 12-15 illustrate various examples of overlap between physical channels, according to some embodiments.

Figure 1:
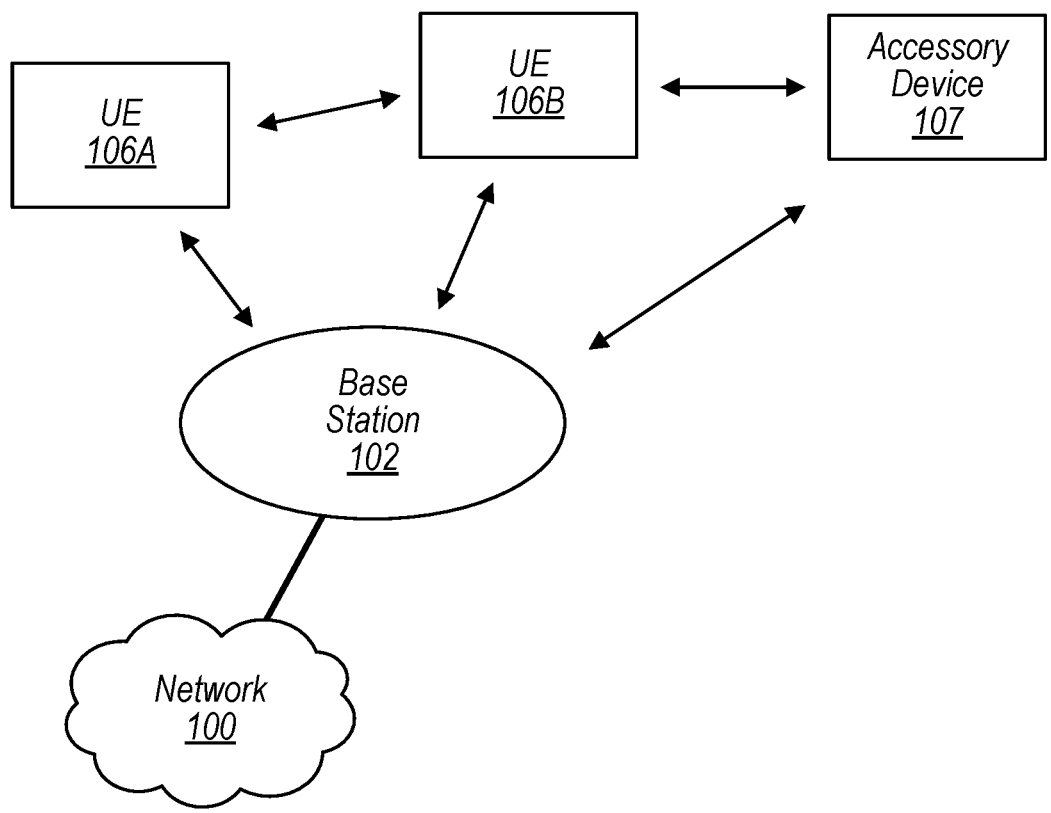
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms and Abbreviations

The following acronyms and abbreviations are used in the present disclosure.
3GPP: Third Generation Partnership Project
3GPP2: Third Generation Partnership Project 2
GSM: Global System for Mobile Communications
UMTS: Universal Mobile Telecommunications System
LTE: Long Term Evolution
RRC: Radio Resource Control
MAC: Media Access Control
CE: Control Element
Tx: Transmission (or transmit)
Rx: Reception (or receive)
RS: Reference Signal
CSI: Channel State Information
PDCP: packet data convergence protocol
RLC: radio link control
MUX: Multiplexing Terminology The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, Play Station Portable™, Gameboy Advance™, iPhone™), wearable devices (e.g., smart watch, smart glasses), laptops, PDAs, portable Internet devices, music players, data storage devices, other handheld devices, vehicle, automobile, unmanned aerial vehicles (e.g., drones) and unmanned aerial controllers, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well as any of various combinations of the above.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
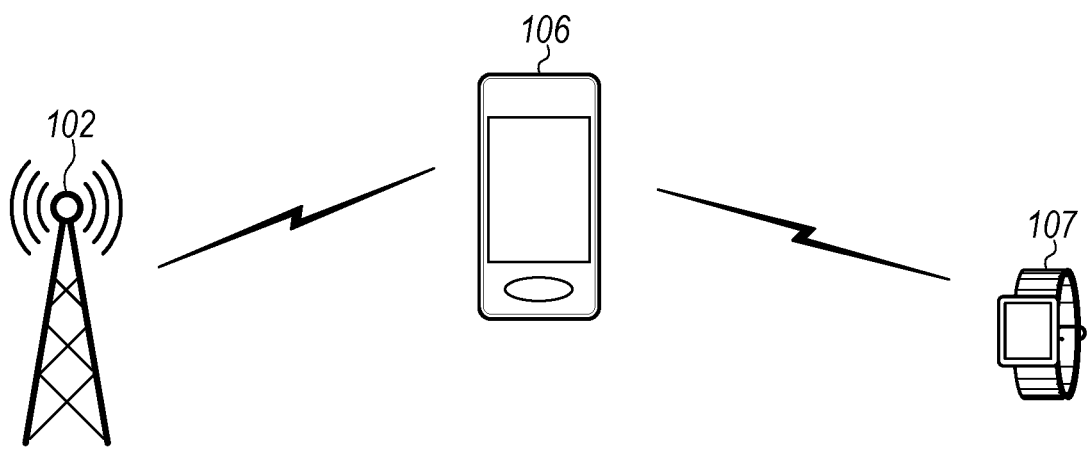
FIG. 2 illustrates an example wireless communication system in which two wireless devices can perform direct device-to-device communication, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware and/or software that enables wireless communication with the UE devices 106A, 106B, and 107. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. As also used herein, from the perspective of UEs, a base station may sometimes be considered as representing the network insofar as uplink (UL) and downlink (DL) communications of the UE are concerned. Thus, a UE communicating with one or more base stations in the network may also be interpreted as the UE communicating with the network.

In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), NR, HSPA, 3GPP2 CDMA2000 (e.g., 1×RTT, 1×EV-DO, HRPD, eHRPD), Wi-Fi, etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of multiple wireless communication technologies. For example, a UE device 106/107 might be configured to communicate using one or more of GSM, UMTS, CDMA2000, LTE, LTE-A, NR, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi. In some instances, the UE 106B and the accessory device 107 may perform direct peer-to-peer communication using proximity services (ProSe) techniques, e.g., in a manner supported by a cellular base station. For example, such ProSe communication may be performed as part of a relay link to support a radio resource control connection between the accessory device 107 and the BS 102, such as according to various embodiments described herein.

The UE 106B may also be configured to communicate with the UE 106A. For example, the UE 106A and UE 106B may be capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102. For example, it may be the case that the UE 106A and UE 106B are capable of arranging and performing D2D communication (e.g., including discovery communications) with each other even when out-of-coverage of the BS 102 and other cellular base stations.

The BS 102 may control one or more transmission and reception points (TRPs) and may use the TRPs to communicate with the UEs. The TRPs may be collocated with the BS and/or at separate physical locations.

FIG. 2 illustrates an example BS 102 in communication with a UE device 106, which in turn is in communication with an accessory device 107. The UE device 106 and accessory device 107 may be any of a mobile phone, a tablet, or any other type of hand-held device, a smart watch or other wearable device, a media player, a computer, a laptop, unmanned aerial vehicle (UAV), unmanned aerial controller, vehicle, or virtually any type of wireless device. In some embodiments, the accessory device may be a wireless device designed to have low cost and/or low power consumption, and which may benefit from use of a relay link with the UE device 106 (and/or another companion device) to support communication with the BS 102. A device that utilizes a relay link with another wireless device to communicate with a cellular base station, such as in the illustrated scenario of FIG. 2, may also be referred to herein as a remote wireless device, a remote device, or a remote UE device, while a wireless device that provides such a relay link may also be referred to herein as a relay wireless device, a relay device, or relay UE device. According to some embodiments, such a BS 102, UE 106, and accessory device 107 may be configured to perform radio resource control procedures for remote wireless devices in accordance with various of the techniques described herein.

The UE 106 and accessory device 107 may each include a device or integrated circuit for facilitating cellular communication, referred to as a cellular modem. The cellular modem may include one or more processors (processing elements) that is configured to execute program instructions stored in memory, and/or various hardware components as described herein. The UE 106 and/or accessory device 107 may each perform any of the method embodiments described herein by executing such stored instructions. Alternatively, or in addition, the UE 106 and/or accessory device 107 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 and/or accessory device 107 may include one or more antennas for communicating using one or more wireless communication protocols according to one or more RAT standards. In some embodiments, one or both of the UE 106 or accessory device 107 might be configured to communicate using a single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

Alternatively, the UE 106 and/or accessory device 107 may include two or more radios. For example, in some embodiments, the UE 106 and/or accessory device 107 may include separate transmit and/or receive chains (e.g., including separate antennas and other radio components) for each wireless communication protocol with which it is configured to communicate. As a further possibility, the UE 106 and/or accessory device 107 may include one or more radios that are shared between multiple wireless communication protocols, and one or more radios that are used exclusively by a single wireless communication protocol. For example, the UE 106 and/or accessory device 107 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
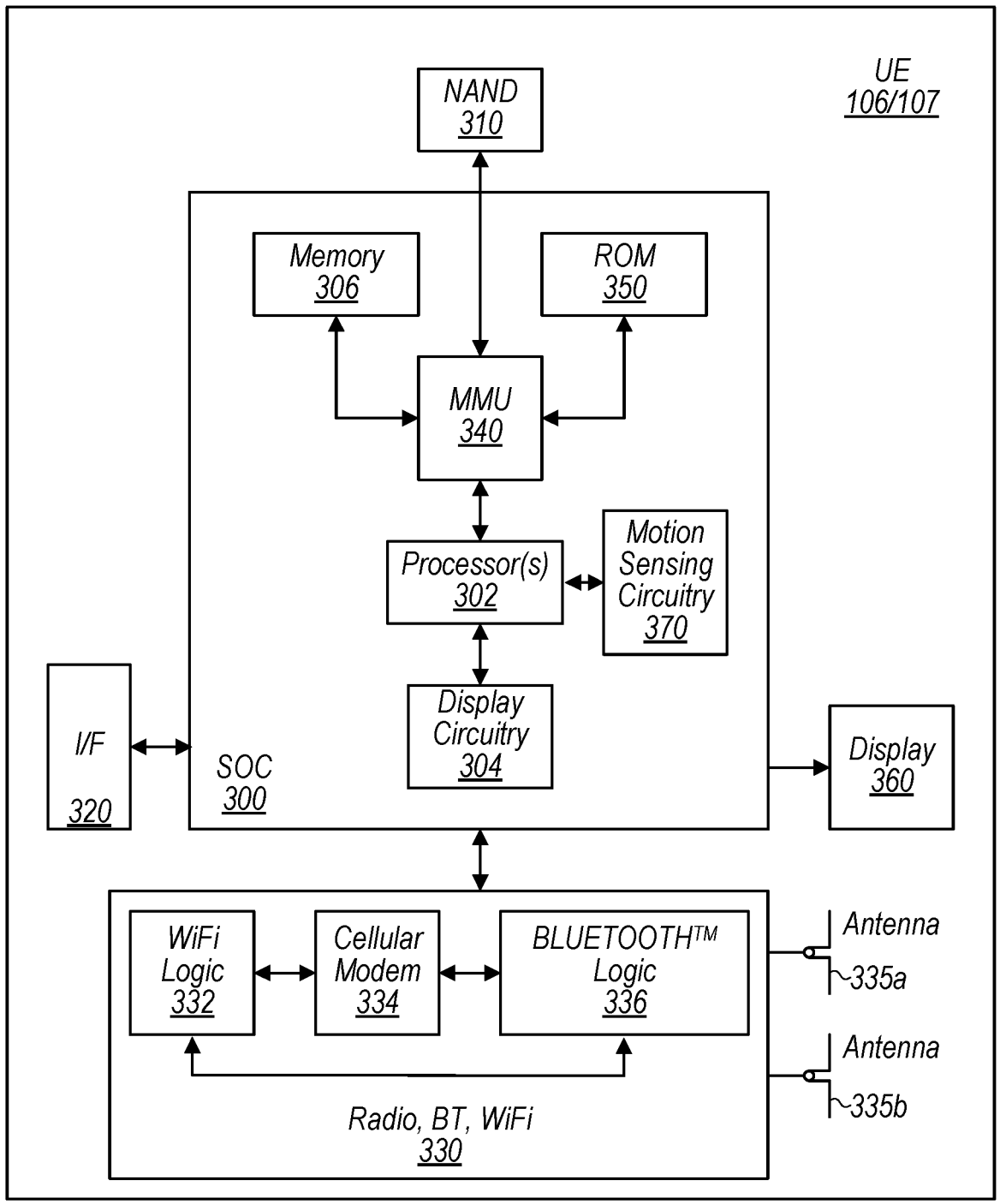
FIG. 3 is a block diagram illustrating an example wireless device, according to some embodiments.

FIG. 3—Block Diagram of a UE Device

FIG. 3 illustrates one possible block diagram of a UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310), and/or to other circuits or devices, such as the display circuitry 304, radio 330, I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash memory 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using multiple wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. The processor(s) 302 of the UE device 106/107 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform radio resource control procedures for remote wireless devices according to various embodiments disclosed herein. Processor(s) 302 may also implement various other applications and/or end-user applications running on UE 106. Alternatively or additionally, one or more components of the wireless communication circuitry 330 (e.g., cellular modem 334) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
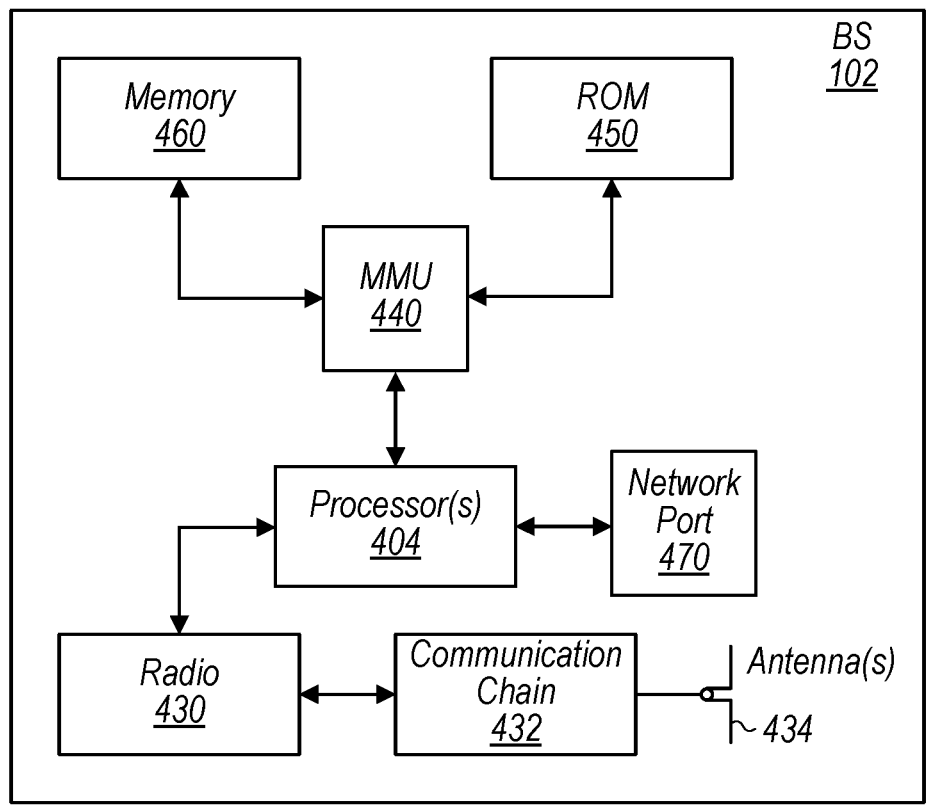
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. For example, the core network may include a mobility management entity (MME), e.g., for providing mobility management services, a serving gateway (SGW) and/or packet data network gateway (PGW), e.g., for providing external data connections such as to the Internet, etc. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and NR, LTE and Wi-Fi, LTE and UMTS, LTE and CDMA2000, UMTS and GSM, etc.).

As described further subsequently herein, the BS 102 may include hardware and software components for implementing or supporting implementation of features described herein. According to some embodiments, the processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of radio resource control procedures for remote wireless devices according to various embodiments disclosed herein, and/or any of various other of the features described herein.

Multiplexing

Multiplexing multiple communications within a single physical channel may allow for reduced overhead, e.g., relative to individual communications. Accordingly, wireless communications such as new radio (NR) and NR-unlicensed (NR-U) may support mechanisms for multiplexing multiple uplink (UL) and/or downlink (DL) communications (e.g., to occur over a period of time) using a physical channel (i.e., a control channel or a shared channel). For example, e.g., for a single UE, multiple physical UL control channel (PUCCH) and/or multiple physical UL shared channel (PUSCH) transmissions may be multiplexed together. Similarly, multiplexing may be performed for downlink communications over multiple physical DL control channel (PDCCH) and/or multiple physical DL shared channel (PDCCH) transmissions, and/or for multiplexing of UL and DL communications.

A downlink control information (DCI) message may be an example of a scheduling message that may be used to schedule multiple communications, e.g., PDSCH, PUSCH, PDCCH, and/or PUCCH. Said another way, scheduling for multiple communications may be provided in DCI signaling.

In instances where multiple uplink transmissions are multiplexed together (e.g., multiple PUCCH and/or PUSCH transmissions), there may be various possibilities for multiplexing uplink control information (UCI) (e.g., on a PUCCH or a PUSCH). The UCI may be or include response data, e.g., hybrid automatic repeat request (HARQ) acknowledgement (ACK) or negative acknowledgement (NACK). The UE may generate response data to indicate whether one or more downlink data transmissions (e.g., including downlink transmissions of control information) are or are not successfully received. The downlink transmission(s) on which the response data is based may be scheduled by a single DCI or by multiple DCIs. The UCI may also or alternatively include scheduling request (SR) and/or channel state information (CSI), among various possibilities.

In some cellular deployments, effective multiplexing of UCI may be complicated by the circumstance that multiple PUCCHs and PUSCHs are concurrently scheduled with partial overlap and different physical priority levels. For example, in some embodiments, a UE may communicate with a base station through both lower priority (LP) PUSCH and PUCCH channels (e.g., for enhanced mobile broadband (eMBB) or other lower priority communications) and higher priority (HP) PUSCH and PUCCH channels (e.g., for ultra-reliable low-latency communications (URLLC) or other higher priority communications).

In some previous deployments, timing overlap conflicts between multiple uplink transmissions of differing priority have been resolved simply by cancelling or rescheduling lower priority transmissions in favor of higher priority transmissions. Multiplexing may improve on these deployments by combining multiple transmissions when an overlap conflict occurs. However, when multiple PUCCH and/or PUSCH transmissions exhibit timing overlap, it can be a non-trivial problem to determine an efficient order and algorithm to schedule multiplexing for the plurality of overlapping transmissions. For example, a particular transmission (e.g., either a PUCCH or PUSCH transmission) may overlap with multiple other transmissions (e.g., PUCCH and/or PUSCH), and it may not be a priori obvious which overlapping transmissions are more desirable to be multiplexed together to avoid the overlap conflict.

As a further complication, Release 15 of 5G NR allows two PUCCHs to occur in a slot (e.g., two short PUCCHs or a short and a long PUCCH), and Release 16 of 5G NR further expands slot allocation according to physical layer priority, as two PUCCHs are allowed in the same slot if a slot-based PUCCH configuration is used for a particular physical layer priority (e.g. for low priority (LP) PUCCHs), and two PUCCHs are allowed in the same sub-slot if the sub-slot based PUCCH configuration is used for another physical layer priority (e.g. for high priority (HP) PUCCHs).

To address these and other concerns, embodiments herein describe processing flows to multiplex UCI for overlapping channels, wherein the messages scheduled on the overlapping channels may be associated with differing levels of physical layer priority (e.g., L1 priority). The proposed processing flow provide an efficient mechanism to address resource conflicts for UL communications, while avoiding recursive processing in determining a multiplexing schedule.

In general, various ones of the LP PUSCH, LP PUCCH, HP PUSCH and HP PUCCH communications may overlap in their scheduled time resources. To avoid the introduction of additional scheduling conflicts, to accommodate larger traffic flows, and to avoid recursive multiplexing rescheduling procedures, it may be desirable to preferentially multiplex communications together which exhibit timing overlap prior to multiplexing. Embodiments herein present methods and devices for a UE to execute a processing flow to seamlessly and efficiently multiplex overlapping UL communications, while accommodating the complications of having multiple active UL channels with multiple respective physical layer priorities.

Figure 5:
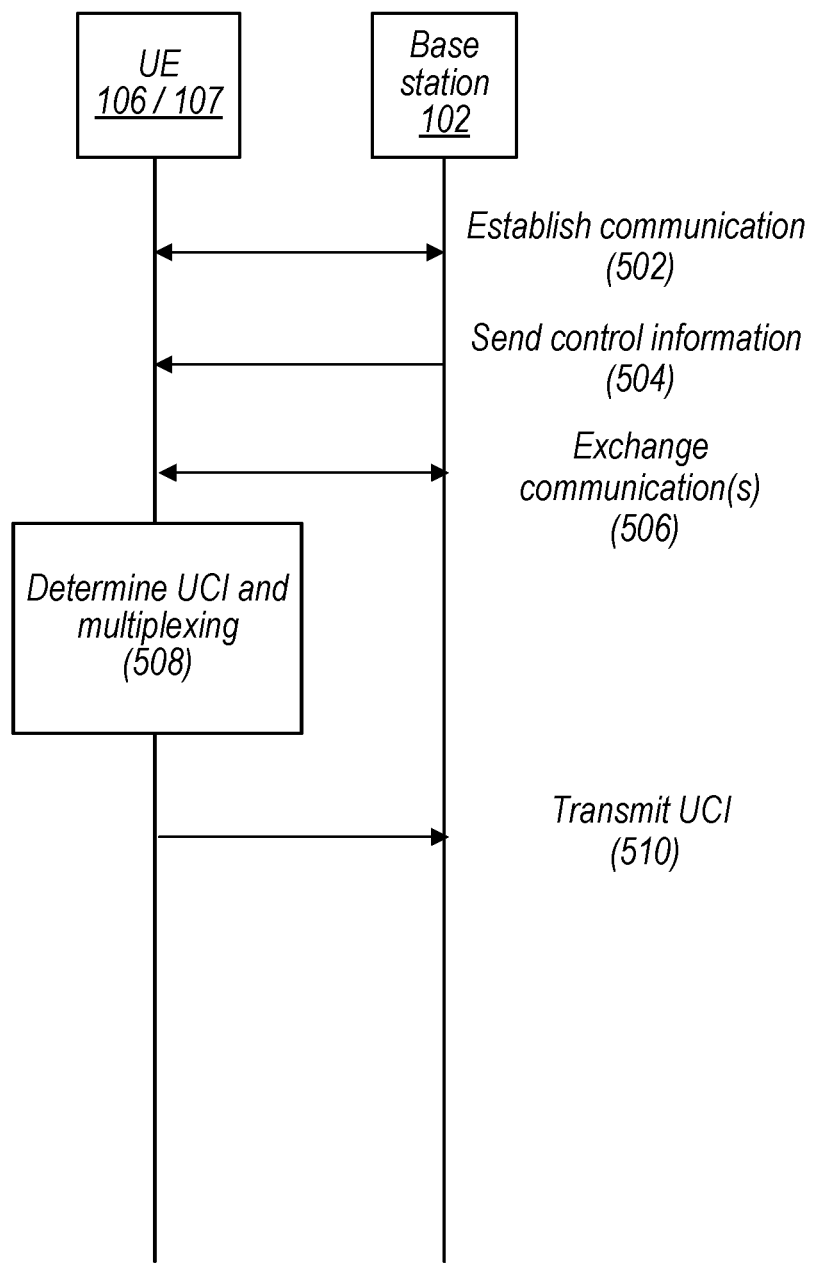
FIG. 5 is a communication flow diagram illustrating a method for multiplexing uplink control information, according to some embodiments.

FIG. 5—Multiplexing UCI Communication Flow Diagram

FIG. 5 is a communication flow diagram illustrating an example method for multiplexing UCI with one or more uplink data transmissions, according to some embodiments. FIG. 5 describes a high-level process for scheduling and performing multiplexing of UCI between a UE and a base station, and some of the method steps of FIG. 5 are described in greater detail in reference to FIG. 6. In various embodiments, some of the elements of the methods shown may be performed concurrently, in a different order than shown, may be substituted for by other method elements, or may be omitted. Additional method elements may also be performed as desired.

Aspects of the method of FIG. 5 may be implemented by a UE, such as the UEs 106 or 107, a cellular network, and/or one or more BS 102, e.g., as illustrated in and described with respect to the Figures, or more generally in conjunction with any of the computer systems, circuitry, elements, components or devices shown in the Figures, among other devices, as desired. For example, one or more processors (or processing elements) (e.g., processor(s) 302, 404, baseband processor(s), processor(s) associated with communication circuitry such as 330, 332, 334, 336, 430, or 432, processors associated with various core network elements, etc., among various possibilities) may cause a UE, network element, and/or BS to perform some or all of the illustrated method elements. Note that while at least some elements of the method of FIG. 5 are described in a manner relating to the use of communication techniques and/or features associated with LTE, NR, and/or 3GPP specification documents, such description is not intended to be limiting to the disclosure, and aspects of the method of FIG. 5 may be used in any suitable wireless communication system, as desired. As shown, the method may operate as follows.

The UE and the base station may establish communication (502), according to some embodiments. Establishing communication between the UE and the base station is described in greater detail in reference to step 602 of FIG. 6, below.

The base station may transmit control/configuration information to the UE (504), according to some embodiments. Transmission of control information to the UE is described in greater detail in reference to step 612 of FIG. 6, below.

The UE may determine UCI and multiplexing for the UCI (508), according to some embodiments. For example, the UE may determine which DL transmissions to positively acknowledge and/or which to negatively acknowledge. In other words, the UE may determine HARQ response data for DL transmissions. The UE may determine whether and how to multiplex the UCI.

The UE may multiplex the UCI and transmit the UCI on the determined resource(s) (510), according to some embodiments. The base station may receive and decode the UCI. The base station may retransmit any DL data for which the UCI indicates that the DL data was not received and/or any DL data for which no response data is included.

As noted above, elements of FIG. 5 may occur in various orders and/or be overlapping. For example, it will be appreciated that 506, 508, and 510 may occur in any order and/or be overlapping. For example, communications (e.g., of 506) may occur before and/or after the response data is generated (e.g., in 508) and/or transmitted (e.g., in 510).

Figure 6:
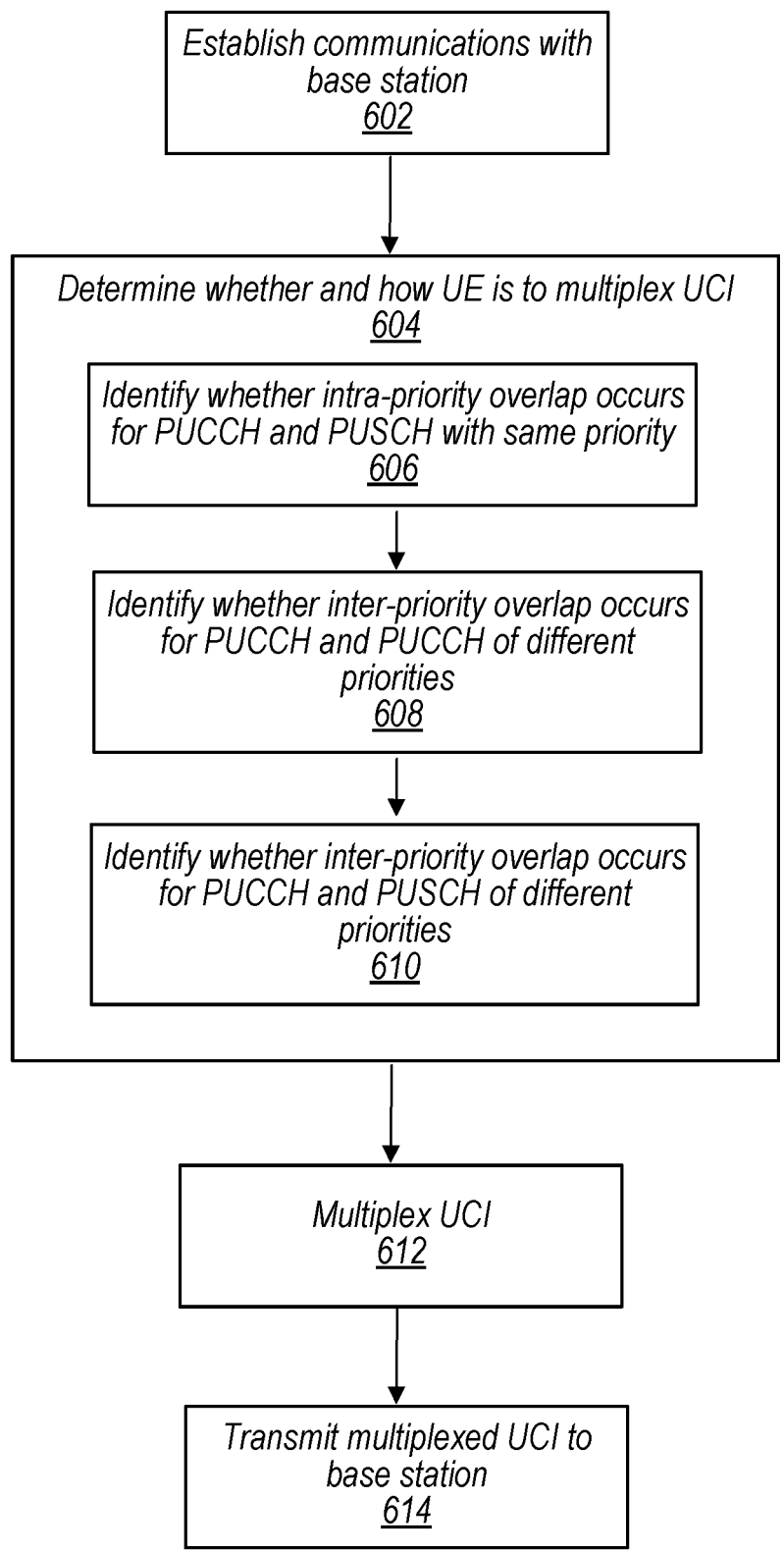
FIG. 6 is a flowchart diagram illustrating a method for a user equipment (UE) to multiplex first uplink control information (UCI), according to some embodiments.

FIG. 6—Flowchart for Multiplexing UCI

FIG. 6 is a flow chart diagram illustrating an example method for multiplexing UCI with other UCI and/or one or more uplink data transmissions, according to some embodiments. As noted above, various steps described in reference to FIG. 6 may be combined with the communication flow diagram described above in reference to FIG. 5. In various embodiments, some of the elements of the methods shown may be performed concurrently, in a different order than shown, may be substituted for by other method elements, or may be omitted. Additional method elements may also be performed as desired.

Aspects of the method of FIG. 6 may be implemented by a UE, such as the UEs 106 or 107, a BS 102, and/or a cellular network, e.g., as illustrated in and described with respect to the Figures, or more generally in conjunction with any of the computer systems, circuitry, elements, components or devices shown in the Figures, among other devices, as desired. For example, one or more processors (or processing elements) (e.g., processor(s) 302, 404, baseband processor(s), processor(s) associated with communication circuitry such as 330, 332, 334, 336, 430, or 432, processors associated with various core network elements, etc., among various possibilities) may cause a BS, network element, and/or UE to perform some or all of the illustrated method elements. Note that while at least some elements of the method of FIG. 6 are described in a manner relating to the use of communication techniques and/or features associated with LTE, NR, and/or 3GPP specification documents, such description is not intended to be limiting to the disclosure, and aspects of the method of FIG. 6 may be used in any suitable wireless communication system, as desired. As shown, the method may operate as follows.

At 602, the UE may establish communications with a base station, according to some embodiments. The UE and the base station may communicate using one or more radio access technologies (RATs), e.g., including NR. The UE and the base station may communicate using any frequency resources, e.g., including NR operations above 52.6 GHz, among various possibilities. The UE and the base station may communicate using one or more frequency carriers, e.g., including licensed and/or unlicensed carriers. The base station may provide one or more cell and/or cell groups and the communication between the UE and the base station may use one or more cell and/or cell group.

The base station may exchange configuration information with the UE. For example, the base station may use radio resource control (RRC) and/or other higher layer signaling to negotiate parameters and/or configure the UE. Among various possibilities, the configuration information may include various parameters relevant to multiplexing UCI. The UE may provide capability information, e.g., relating to its multiplexing ability with respect to UCI and/or other capabilities. For example, the UE may provide information about relevant processing delay time(s), or this information may be determined from predetermined specifications. The UE may report its capability for supporting UCI multiplexing for channels at different physical layer priorities. The base station may subsequently configure the UE with UCI multiplexing for channels at different physical layer priorities. For example, the base station may respond to the UE indicating that the UE may proceed with UCI multiplexing.

The base station may configure PUCCH resources for SR feedback and/or SPS HARQ-ACK feedback. There can be physical layer priority-specific configuration(s) for SR feedback and/or SPS HARQ-ACK feedback. The base station may configure PUCCH resource set(s) and PUCCH resources associated with each PUCCH resource set for dynamic grant HARQ-ACK feedback. There may be physical layer priority-specific configuration(s) for dynamic grant (DG) HARQ-ACK feedback, and the base station may configure PUCCH resources for CSI feedback. In other words, the base station may send configuration information to the UE indicating assigned time and frequency resources for the UE to transmit various types of uplink control information and/or data transmissions. For example, the base station may include one or more indications in the DCI(s) such as PUCCH resource index (PRI) and/or UL-total DL assignment index (UL-TDAI), etc. that may be useable by the UE to determine whether and how to perform UCI multiplexing. As described in detail below, this configuration information may be utilized by the UE to identify timing overlap between different UCIs and uplink data transmissions.

Additionally or alternatively, the base station may activate zero, one or more SPS configurations, and/or provide zero, one or more DG PDSCHs to the UE, which may be interspersed with the SPS configurations.

For example, the configuration information may include an indication of whether the UE may be expected to have more than one PUCCH overlapping a PUSCH, e.g., in a multi-PUSCH scheduled by a single DCI. Further, a particular or maximum number of PUCCHs that may overlap PUSCH for a multi-PUSCH may be established. Still further, one or more configurations for selecting particular PUSCHs for multiplexing PUCCH may be included, e.g., indicated by the BS to the UE. For example, the configuration information may indicate that the last one or more PUSCHs may be used for multiplexing, or that a particular pattern of PUSCHs (e.g., every third PUCCH, etc.) may be used for multiplexing.

In some embodiments, in establishing the connection between the base station and the UE, the UE may provide configuration information indicating support for simultaneous PUCCH/PUSCH transmission (e.g., at different component carriers from different bands), and the base station may configure simultaneous PUCCH/PUSCH transmissions with the UE. Alternatively, the UE and the base station may communicate without simultaneous PUCCH/PUSCH transmission (i.e., where PUCCH and PUSCH transmission to not occur simultaneously).

In some embodiments, the control information may include semi-persistent scheduling (SPS). For example, the control information may include an SPS grant for PDSCH, e.g., scheduling periodic downlink transmissions. SPS may be scheduled by DCI.

At 604, the UE may determine whether to multiplex first uplink control information (UCI) of a first physical uplink control channel (PUCCH). The first UCI may include one or more of a hybrid automatic repeat request (HARQ) acknowledgment (ACK) or negative acknowledgment (NACK) message, a scheduling request (SR), or channel state information (CSI), among other possibilities.

Figure 11:
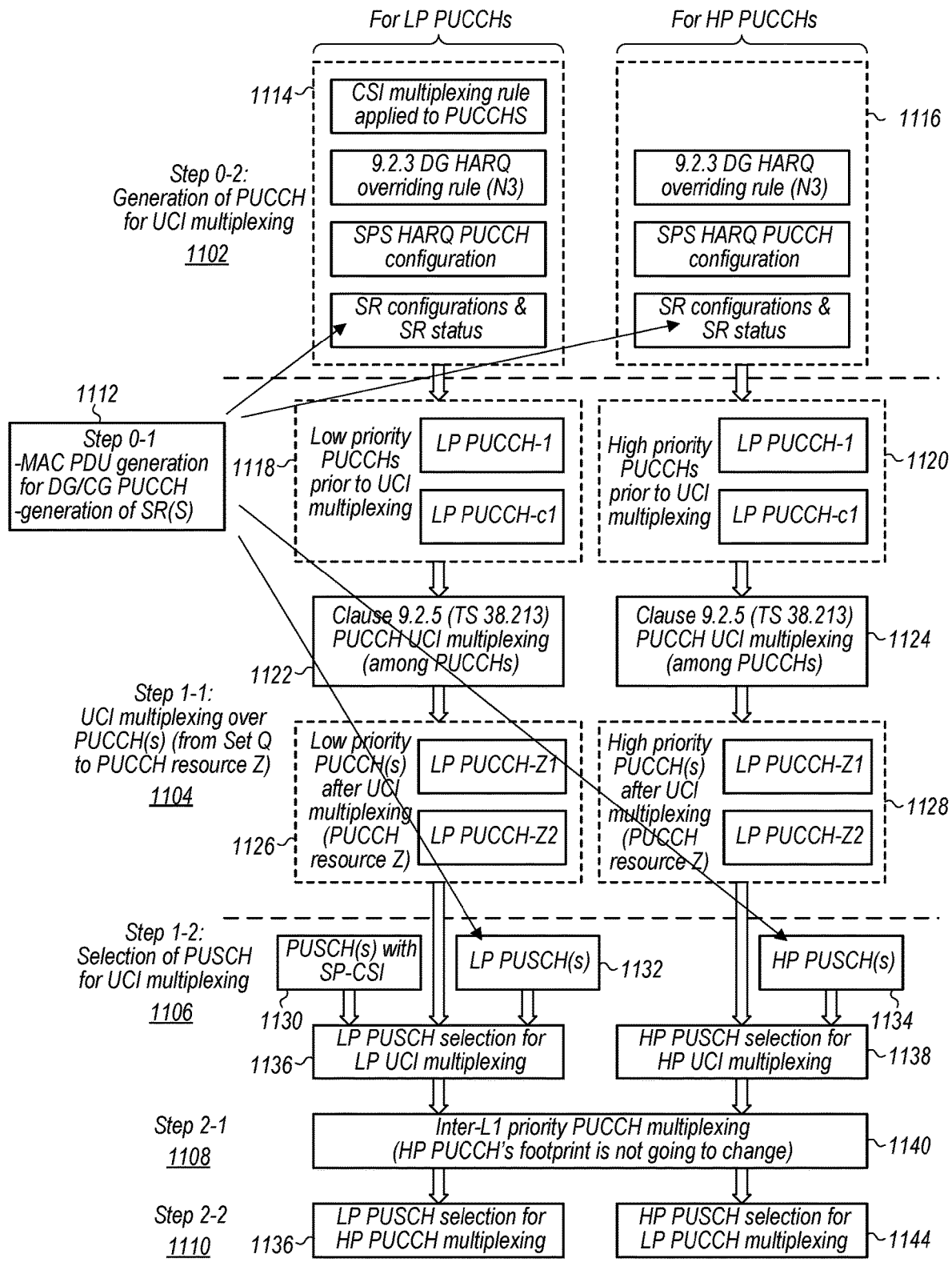
FIG. 11 is a flowchart diagram illustrating parallel multiplexing determinations for high and low priority PUCCHs, according to some embodiments.

For simplicity, the following steps 606-610 are described in reference to determining whether and how to multiplex a first UCI of a first PUCCH within one or more other PUCCHs and/or PUSCHs, of the same or different priorities. More generally, steps 606-610 may be concurrently performed for multiple UCIs within multiple respective PUCCHs with different priorities. For example, as shown in FIG. 11, multiplexing determinations and scheduling may be concurrently performed in parallel for both LP PUCCHs and HP PUCCHs (i.e., each of steps 606-610 may be concurrently performed for one or more first LP UCIs and one or more second HP UCIs, as desired).

The first PUCCH (and the first UCI) may have a first physical layer priority, which may be low priority, a high priority, or an intermediate priority. The first UCI and its associated PUCCH are generally considered to have the same physical priority level (i.e., the same physical layer priority) when all the UCIs carried over a single PUCCH are of the same physical priority level. As explained in greater detail below, determining whether to multiplex the first UCI may be performed by first identifying whether intra-priority timing overlap exists between the timing resources of the first UCI and a PUSCH with the same priority, followed by identifying inter-priority timing overlap between the timing resources of the first UCI and UL channels with a different priority than the first PUCCH (e.g., either a higher or lower priority). For the identification of inter-priority timing overlap, the UE may first determine whether the timing resources of the first UCI overlap with a second PUCCH with a different priority, followed by a determination whether the timing resources of the first UCI overlap with a second PUSCH with a different priority, in some embodiments.

For example, in determining whether to multiplex the first UCI, at 606 the UE may first identify whether one or more timing resources of the first UCI overlap with one or more timing resources of a first physical uplink shared channel (PUSCH) having the same first physical layer priority as the first UCI. Identifying an overlap may cause the UE to multiplex the first UCI within the first PUSCH.

At 608, subsequent to identifying whether the one or more timing resources of the first UCI overlap with the one or more timing resources of the first PUSCH, the UE may identify whether the one or more timing resources of the first UCI overlap with one or more timing resources of a second PUCCH having a second physical layer priority different from the first physical layer priority. For example, the first physical layer priority may be low priority (e.g., it may be associated with enhanced mobile broadband (eMBB) communications) and the second physical layer priority may be high priority (e.g., it may be associated with ultra-reliable low-latency communications (URLLC)). Alternatively, the first physical layer priority may be higher and the second physical layer priority may be lower. Identifying an overlap at step 608 may cause the UE to multiplex the first UCI within the second PUCCH. Note that this may occur when an overlap was not identified at step 606 between the first UCI and the first PUSCH.

Figure 8:
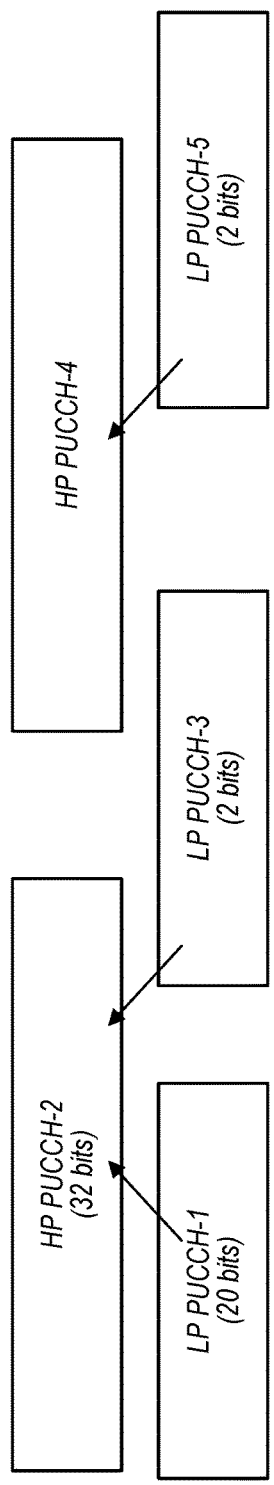
FIG. 8 is a schematic illustration of multiplexing low priority PUCCHs within high priority PUCCHs, according to some embodiments.

In some embodiments, identifying whether the first PUCCH (with the first priority) overlaps in time with a second PUCCH with a second, different priority is performed by scanning for overlap from earlier PUCCHs having the first priority to later PUCCHs having the first priority. In some embodiments, "earlier" and "later" may refer to the timing of the resource Z allocations for the respective PUCCHs. For example, as shown in FIG. 8, the low priority (LP) PUCCH-1 and LP PUCCH-3 may be identified as overlapping with the earlier high priority (HP) PUCCH-2, without identifying whether they overlap with the later-occurring HP PUCCH-4. In other words, when the PUCCH of the UCI overlaps with multiple other PUCCHs with a different priority, the UCI may be multiplexed with the earlier overlapping PUCCH.

Alternatively, in some embodiments identifying whether the first PUCCH (with the first priority) overlaps in time with a second PUCCH with a second, different priority is performed by scanning for overlap from later PUCCHs having the first priority to earlier PUCCHs having the first priority. In some embodiments, "earlier" and "later" may refer to the timing of the resource Z allocations for the respective PUCCHs. For example, as shown in FIG. 8, the low priority (LP) PUCCH-1 and LP PUCCH-3 may be identified as overlapping with the earlier high priority (HP) PUCCH-2, without identifying whether they overlap with the later-occurring HP PUCCH-4. In other words, when the PUCCH of the UCI overlaps with multiple other PUCCHs with a different priority, the UCI may be multiplexed with the earlier overlapping PUCCH.

Finally, at 610, subsequent to identifying whether the one or more timing resources of the first UCI overlap with the one or more timing resources of the second PUCCH, the UE may identify whether the one or more timing resources of the first UCI overlap with one or more timing resources of a second PUSCH having a third physical layer priority. In various embodiments, the third physical layer priority may be the same as the first physical layer priority, the same as the second physical layer priority, or it may be a third different physical layer priority. Identifying an overlap at step 610 may cause the UE to multiplex the first UCI within the second PUSCH. Note that this may occur when an overlap was not identified at steps 606 or 608 between the first UCI and the first PUSCH or the second PUCCH. Alternatively, this may occur when an overlap was identified at step 608 such that the first UCI is scheduled within the second PUCCH, and an overlap may be subsequently identified at step 610 between the second PUCCH and the second PUSCH. In these embodiments, the first UCI and potentially second UCI originally scheduled within the second PUCCH may both be multiplexed by the UE within the second PUSCH. This alternative is described in greater detail below in reference to FIG. 15.

In some embodiments, the base station may perform a parallel algorithm to the UE method steps 604-610. For example, the base station has access to the resource assignments granted to the UE for uplink transmissions, and may use this knowledge to identify how the UE will multiplex the first UCI with one or more other uplink transmissions. Accordingly, the base station may be able to predict when it may expect to receive the uplink transmissions from the UE, and may monitor for the first UCI and other uplink transmissions accordingly.

At 612, the UE multiplexes the first UCI based on the determination whether to multiplex the first UCI. Multiplexing the first UCI may include one or more of multiplexing the first UCI within the first PUSCH, multiplexing the first UCI with the second UCI within the second PUCCH, or multiplexing the first UCI within the second PUSCH.

In some embodiments, multiplexing the first UCI with a PUSCH (e.g., a PUSCH of either higher, lower, or the same physical priority as the first PUCCH of the UCI) may be performed dependent on whether simultaneous PUCCH/PUSCH transmissions are configured for the connection with the UE. In some embodiments, when simultaneous PUCCH/PUSCH transmission with the UE is configured, the first UCI may be multiplexed with a PUSCH with the same or a different priority. In these embodiments, the component carrier(s) of the PUSCH may be selected to occur within a same band as the component carrier(s) of the first PUCCH of the first UCI. This is illustrated schematically in FIG. 7, where a PUCCH configured within a first component carrier (CC), CC-1, is multiplexed with a PUSCH (PUSCH 1) configured within the same CC-1. Alternatively, in these embodiments the PUCCH may be multiplexed with a PUSCH on CC-2, as CC-2 is in the same band as CC-1 (i.e., band-1). Note that the presence or absence of PUSCH-3/PUSCH-4 on CC-3/CC-4 respectively and their time-domain overlapping with PUCCH in Band-1 does not affect the UE's multiplexing processing within Band-1.

Figure 7:
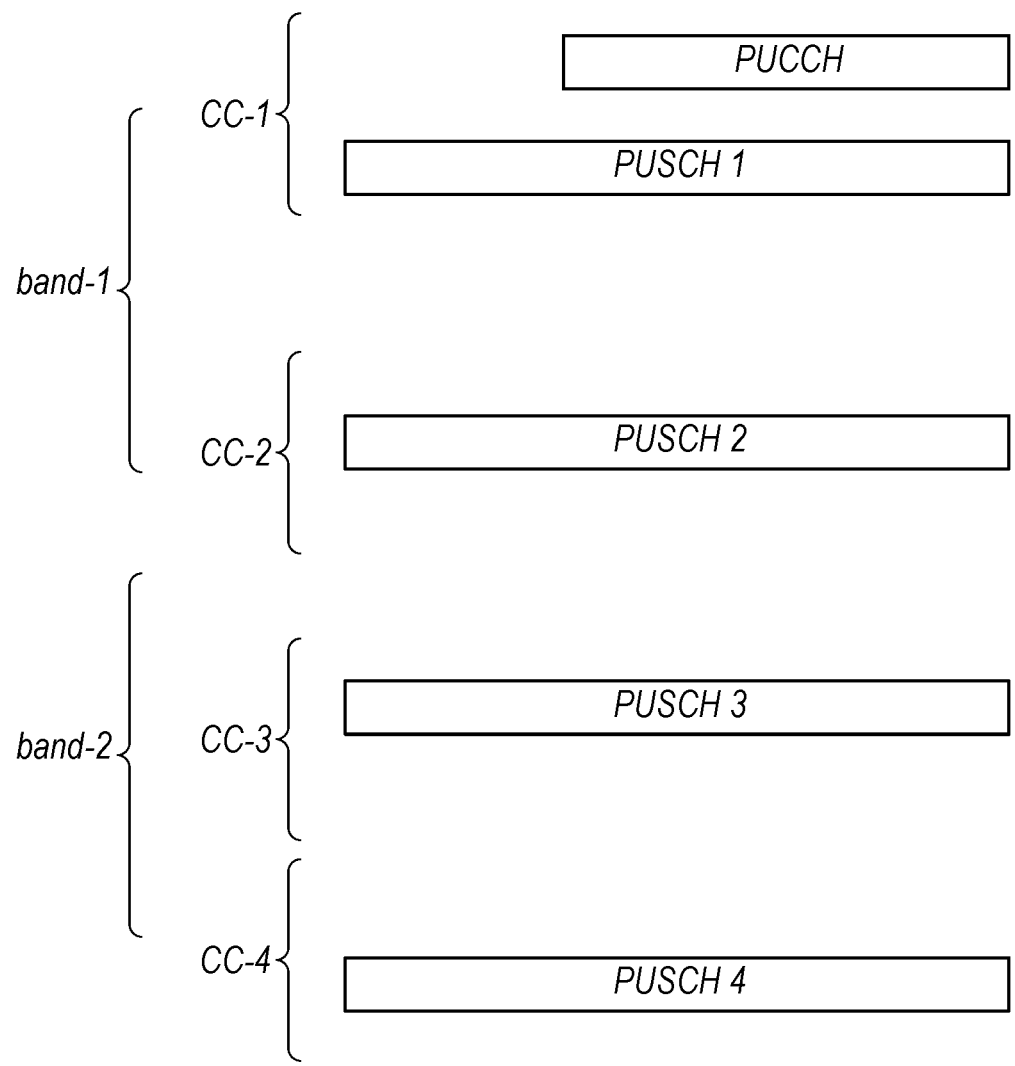
FIG. 7 is a schematic illustration of multiplexing a PUCCH with a PUSCH having a component carrier in the same band, according to some embodiments.

Alternatively, in other embodiments, when simultaneous PUCCH/PUSCH transmission with the UE is configured, any component carrier of the second PUSCH may be selected for multiplexing the first UCI (i.e., any of CC's 1-4 shown in FIG. 7 may be selected for multiplexing the first UCI). When simultaneous PUCCH/PUSCH transmission with the UE is not configured, any component carrier of the PUSCH may be selected for multiplexing the first UCI (i.e., any of CC's 1-4 shown in FIG. 7 may be selected for multiplexing the first UCI).

In some embodiments, multiplexing the first UCI includes multiplexing the first UCI with second UCI associated with a different priority from the first UCI. In these embodiments, the first UCI with the second UCI may be multiplexed together within the second PUCCH of the second UCI. This is shown schematically in FIG. 9, where a first LP UCI of LP PUCCH-1, a second HP UCI of HP PUCCH-2, and a third LP UCI of LP PUCCH-3 are all multiplexed together within HP PUCCH-2 without altering the timing and physical resource block (PRB) resources of the HP PUCCH. These embodiments may be utilized when HP PUCCH-2 has sufficient resources to accommodate each of the three UCIs. Alternatively, one or more of the UCIs may be trimmed, compacted, or dropped to accommodate the available resources of the HP PUCCH. Said another way, the HP PUCCH that results after UCI multiplexing processing of a HP PUCCH and overlapping PUCCHs at different physical layer priorities may be restricted to be the same as the HP PUCCH prior to UCI multiplexing processing. The UCI payload size of the resulted HP PUCCH does not affect PRB number adjustments of the resulting HP PUCCH Alternatively, as shown in FIGS. 10A and 10B, HP PUCCH-2 may be modified to accommodate the additional multiplexed UCIs. For example, in FIG. 10A, HP PUCCH-2 is expanded to include 5 PRBs (rather than 3 PRBs), and the same timing symbols (0-3) are maintained.

Said another way, the HP PUCCH resulting from UCI multiplexing processing of a HP PUCCH and overlapping PUCCHs at different physical layer priorities may be restricted to have the same time resources as the HP PUCCH resource prior to UCI multiplexing processing, and the UCI payload size of the resulting HP PUCCH may be used to adjust the PRB number of the resulting HP PUCCH resource. The condition to trigger PRB number adjustment may be given by $$\left(\sum\nolimits_{n=1}^{N_{UCI-part2}^{total}} O_{UCI-part2,n} + O_{CRC,UCI-part2}\right)/(Q_m \cdot r_2) +$$

$$\left(\sum\nolimits_{n=1}^{N_{UCI-part1}^{total}} O_{UCI-part1,n} + O_{CRC,UCI-part1}\right)/(Q_m \cdot r_1) \le$$

$$M_{RB}^{PUCCH} \cdot N_{sc,ctrl}^{RB} \cdot N_{symb-UCI}^{PUCCH}$$

Where $Q_m$ is the modulation order of PUCCH, $r_1$ and $r_2$ are the maximum code rate of the HP and LP UCIs or the HP HARQ-ACK/LP HARQ-ACK, respectively, $O_{CRC,UCI-part1}$ and $O_{CRC,UCI-part2}$ are the number of CRC bits for UCI part 1 and UCI part 2, $N_{UCI-part1}^{total}$ and $N_{UCI-part2}^{total}$ are the number of UCI components for UCI part 1 and UCI part 2 respectively (e.g. if only HARQ-ACK and SR are included UCI part 1 then $N_{UCI-part1}^{total}=2$), $O_{UCI-part1,n}$ is the payload size of component n in UCI part 1 and $O_{UCI-part2,n}$ is the payload size of component n in UCI part 2, $M_{RB}^{PUCCH}$ is the nominal PRB number of the HP PUCCH resource, $N_{sc,ctrl}^{RB}$, $N_{symb-UCI}^{PUCCH}$ are described in Clause 9.2.5.2 of TS 238.12. respectively. Similarly, the stop condition for PRB number adjustment can be modified in Rel-17 as follows:

$$\left(\sum\nolimits_{n=1}^{N_{UCI-part2}^{total}} O_{UCI-part2,n} + O_{CRC,UCI-part2}\right)/(Q_m \cdot r_2) +$$

$$\left(\sum_{n=1}^{N_{UCI-part1}^{total}} O_{UCI-part1,n} + O_{CRC,UCI-part1}\right)/(Q_m \cdot r_1) \le$$

$$M_{RB,min}^{PUCCH} \cdot N_{sc,ctrl}^{RB,min} \cdot N_{symb-UCI}^{PUCCH}$$

Alternatively, FIG. 10B illustrates an embodiment where HP PUCCH-2 is expanded in frequency to include 10 PRBs but contracted in time to include only symbols 1-3. In general, the time resources of the PUCCH that is multiplexing additional UCIs may be maintained or contracted (but not expanded) to avoid introducing scheduling conflicts. In other words, the modified PUCCH may include at least a subset of the timing resources (e.g., the OFDM symbols) of the unmodified PUCCH. The PRBs of the modified PUCCH may be expanded to include additional PRBs not allocated to the unmodified PUCCH. Assuming the combined payload size of HP UCI(s) and LP UCI(s) are used to look up a PUCCH resource set first, then within the identified PUCCH resource set, a PUCCH resource matching the PRI indication in a DCI may be used for the resulting HP PUCCH. If the resulting PUCCH does not occupy any OFDM symbol which is not occupied by the original HP PUCCH-2, then the resulting HP PUCCH may be used for UCI multiplexing. Otherwise, the original HP PUCCH (e.g., the original unmodified HP PUCCH-2 in this example) may be used for UCI multiplexing. The PRB number adjustment may be similarly performed as for FIG. 10A.

Figure 15:
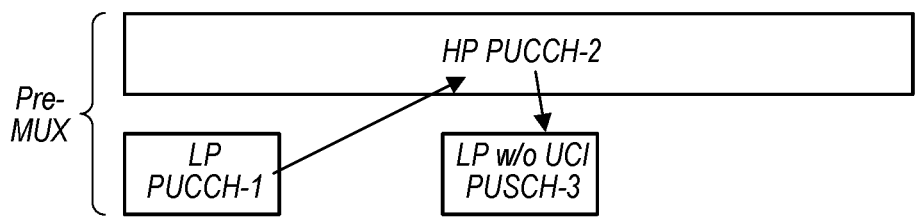

In some embodiments, multiplexing the first UCI may involve a sequence of a plurality of sequential multiplexing steps. For example, as shown schematically in FIG. 15, first UCI of LP PUCCH-1 may be multiplexed with second UCI of HP PUCCH-1 into HP PUCCH-1 (e.g., in response to determining the timing overlap at step 608). Subsequently, it may be determined that HP PUCCH-1 overlaps with LP PUSCH-3 at step 610, and both the first and second UCIs may be multiplexed within LP PUSCH-3, at least according to some embodiments. The sequence of multiplexing the plurality of sequential steps may be determined by scanning for timing overlap from left to right (i.e., from earlier overlap to later overlap). While scanning, the HP PUCCHs may be used as references, and LP PUCCHs overlapping with the earliest unscanned HP PUCCH may be identified for multiplexing. FIG. 15 illustrates an example where LP PUCCH-1 and LP PUSCH-3 are low priority and HP PUCCH-2 is high priority, but more generally each of the three channels may have any combination of differing priority levels.

At 614, the UE may transmit the multiplexed first UCI to the base station, according to some embodiments. For example, the UE may transmit the multiplexed first UCI (and potentially one or more other UCIs and/or UL data transmissions) to the base station according to the multiplexing schedule determined by the UE.

The UE may determine UCI and multiplexing for the UCI, according to some embodiments. For example, the UE may determine which DL transmissions to positively acknowledge and/or which to negatively acknowledge. In other words, the UE may determine HARQ response data for DL transmissions.

The response data may be determined based on whether the DL data was received and/or based on scheduling information. For example, in some embodiments, the UE may determine some or all of the response data based on when DCI scheduling the DL transmission was received (e.g., relative to other events, e.g., DCI scheduling a UL transmission opportunity that the UE may use to multiplex the response data). As another example, the UE may determine some or all of the response data based on a scheduled time for the DL transmissions (e.g., relative to other events, e.g., a UL transmission opportunity that the UE may use to multiplex the response data or a first UL transmission of a multi-PUSCH).

The UE may determine resources to use for transmitting the response data. For example, the UE may select one or more PUSCH overlapped with PUCCH for multiplexing the response data. The UE may select the PUSCH(s) to use for multiplexing (e.g., from multiple overlapped PUSCHs) based on the control information and/or based on other factors, e.g., such as timing of the PUSCH(s). For example, the UE may consider indications in the DCI(s) such as PUCCH resource index (PRI) and/or UL-total DL assignment index (UL-TDAI), etc. As another example, the UE may consider timing of the PUSCH(s) relative to other events, such as timing of related DL transmissions, timing of DCI, and/or timing/position of the PUSCH(s) relative to other PUSCHs of a multi-PUSCH.

The base station may similarly determine (e.g., predict) what resources the UE may use, according to some embodiments. For example, the base station may consider indications included in the DCI, scheduling information, relative timing, etc. In other words, the base station may determine when (e.g., on what resources) to expect the UCI and how to interpret any response data received in various resources. For example, the base station may determine that response data received in a first resource may correspond to a first DL transmission and that response data received in a second resource may correspond to a second DL transmission. Said another way, the base station may determine which PUSCH of a multi-PUSCH may include multiplexed UCI. In some embodiments, standards and/or configuration may be sufficiently specific that it may be unambiguous what resources the UE may use. In some embodiments, the specification and/or configuration may allow for multiple possibilities. Thus, the base station may determine a plurality of possible resources that the UE may use to provide the UCI and may perform blind decoding of the possible resources.

The UE may multiplex the UCI and transmit the UCI on the determined resource(s), according to some embodiments. The base station may receive and decode the UCI. The base station may retransmit any DL data for which the UCI indicates that the DL data was not received and/or any DL data for which no response data is included.

As noted above, elements of FIG. 6 may occur in parallel for multiple UCIs with different priorities and/or be overlapping.

FIG. 11—Parallel Multiplexing Scheduling

FIG. 11 is a detailed flowchart illustrating concurrent multiplexing scheduling for one or more LP UCIs within respective LP PUCCHs and one or more HP UCIs within respective HP PUCCHs. FIG. 11 provides supplemental detail compared to the methods described in reference to FIG. 6, and explicitly illustrates how the determination of whether and how to multiplex UCI is performed concurrently for both LP UCI and HP UCI. Steps 0-1 and 0-2 may be initiated by the UE using information (i.e., control and/or configuration information) received from the base station. Steps 1-1, 1-2, 2-1, and 2-2 may be performed by the UE and/or the base station to determine a multiplexing schedule for UCI.

First, at Step 0-1, Media Access Control (MAC) packet data units (PDUs) are generated for DG/CG PUCCH, and or scheduling requests are generated.

At Step 0-2, for both LP UCIs and HP UCIs, respective PUCCHs are generated for UCI multiplexing. LP UCIs additionally have a channel state information (CSI) multiplexing rule applied to the respective PUCCHs.

In Step 1-1, for each physical layer priority, Set Q resources for the PUCCHs are used as inputs for a physical layer priority-specific UCI multiplexing processing procedure that produces PUCCH resources Z (FIG. 11 illustrates this being performed for each of two LP PUCCHs and two HP PUCCHs). Said another way, intra-L1 priority PUCCH multiplexing is conducted where, for a given L1 priority, the Set Q is collected and PUCCH resources Z are generated through intra-L1 priority UCI multiplexing. The PUCCHs at another priority are not considered for PUCCH multiplexing at the given L1 priority (i.e., the LP and HP processing steps are independent from each other).

In Step 1-2, for a given L1 priority, intra-L1 priority PUCCH/PUSCH multiplexing is conducted over PUCCH/PUSCH over each L1 priority. The PUCCHs/PUSCHs at another priority are not considered. Note that when a UE is capable of simultaneous PUCCH/PUSCH transmission and when the gNB configures the UE to operate with simultaneous PUCCH/PUSCH transmission, PUSCHs residing over CCs in the same band as the PUCCH's CC's, if they overlap with the PUCCH, may be candidates for UCI multiplexing over PUSCH. After Step 1-2, within a physical layer priority, there will be no overlap between any PUCCH and any PUSCH over CCs in the same band as the PUCCH's CC(s).

For a UE that does not support simultaneous PUCCH/PUSCH transmission or a UE which is not configured to operate with simultaneous PUCCH/PUSCH transmission, PUSCHs residing over all CCs in the cell group or the PUCCH-Scell group, if they overlap with the PUCCH, may be candidates for UCI multiplexing over PUSCH. After Step 1-2, within a physical layer priority, there will be no overlap between any PUCCH and any PUSCH for all CCs in the cell group or the PUCCH-Scell group.

Figure 9:
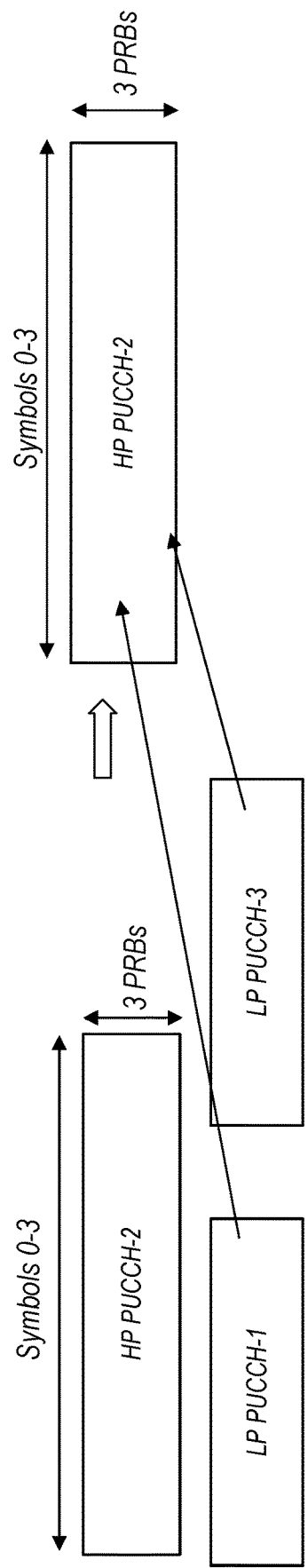
FIG. 9 is a schematic illustration of multiplexing low priority PUCCHs within an unmodified high priority PUCCH, according to some embodiments.

In Step 2-1, inter-L1 priority PUCCH multiplexing is performed. Methods as illustrated in FIG. 9, FIG. 10A and FIG. 10B may be used for Step 2-1. It is noted after Step 2-1, PUCCHs do not overlap irrespective of their L1 priorities.

In Step 2-2, Inter-L1 priority PUCCH/PUSCH multiplexing is performed. When simultaneous PUCCH/PUSCH transmission is supported by the UE, and this feature is configured by the base station for a LP PUCCH, to select a HP PUSCH for UCI multiplexing the candidate CCs for PUCCH multiplexing may be limited to those CCs in the same band as the PUCCH CC (other than this, the PUSCH selection rule may remain unmodified) and only HP PUSCHs over those CCs may be candidates. In NR Rel-15 design, PUSCH selection for UCI multiplexing considers a number of factors. To select a PUSCH from multiple HP PUSCHs overlapping with the LP PUCCH, the following priority rules may apply:

First priority: HP PUSCH with A-CSI as long as it overlaps with the LP PUCCH.
Second priority: earliest HP PUSCH slot(s) based on the start of the slot(s). If after applying the first priority and the second priority rules, there are still multiple HP PUSCHs overlapping with the LP PUCCH in the earliest HP PUSCH slot(s), then third, fourth and fifth priorities may be sequentially applied.
Third priority: Dynamic grant HP PUSCHs are of higher priority than HP PUSCHs configured by respective ConfiguredGrantConfig
Fourth priority: HP PUSCHs on a CC serving cell with smaller CC serving cell index is of higher priority than HP PUSCHs on CC serving cell with larger CC serving cell index.
Fifth priority: Earlier HP PUSCH transmission is of higher priority than later HP PUSCH transmission.

For a HP PUCCH, to select a LP PUSCH for UCI multiplexing, the candidate CCs for PUCCH multiplexing may be limited to those CCs in the same band as the PUCCH CC and only LP PUSCHs over those CCs may be candidates. To select a PUSCH from multiple LP PUSCHs overlapping with the HP PUCCH, the following priority rules may apply:

First priority: LP PUSCH with A-CSI as long as it overlaps with the HP PUCCH.
Second priority: earliest LP PUSCH slot(s) based on the start of the slot(s). If after applying the first priority and the second priority rules, there are still multiple LP PUSCHs overlap with the HP PUCCH in the earliest LP PUSCH slot(s), then third, fourth and fifth priorities may be sequentially applied.
Third priority: Dynamic grant LP PUSCHs is of higher priority than LP PUSCHs configured by respective ConfiguredGrantConfig or semiPersistentOnPUSCH.
Fourth priority: LP PUSCHs on a CC serving cell with a smaller CC serving cell index is of higher priority than LP PUSCHs on a CC serving cell with a larger CC serving cell index.
Fifth priority: An earlier LP PUSCH transmission is of higher priority than a later LP PUSCH transmission.

In some embodiments, dynamic and/or semi-static slot format indicator (SFI) may be applied to remove colliding PUCCHs and/or PUSCHs.

FIGS. 12-15—Examples of Physical Channel Timing Overlap

FIGS. 12-15 illustrate various examples of how overlap between physical channels may lead to multiplexing, according to some embodiments.

FIG. 12A illustrates a scenario where a long duration LP PUCCH-1 overlaps with both short duration HP PUCCH-2 and short duration HP PUCCH-4. HP PUCCH-2 occurs earlier, so that the LP UCI of LP PUCCH-1 is multiplexed with HP PUCCH-2.

In some embodiments, identifying whether the first PUCCH (with the first priority) overlaps in time with a second PUCCH with a second, different priority is performed by scanning for overlap from later PUCCHs having the first priority to earlier PUCCHs having the first priority. In some embodiments, "earlier" and "later" may refer to the timing of the resource Z allocations for the respective PUCCHs. For example, as shown in FIG. 8, the low priority (LP) PUCCH-1 and LP PUCCH-3 may be identified as overlapping with the earlier high priority (HP) PUCCH-2, without identifying whether they overlap with the later-occurring HP PUCCH-4. In other words, when the PUCCH of the UCI overlaps with multiple other PUCCHs with a different priority, the UCI may be multiplexed with the later overlapping PUCCH. FIG. 12B illustrates a scenario where a long duration LP PUCCH-1 overlaps with both short duration HP PUCCH-2 and short duration HP PUCCH-4. HP PUCCH-4 occurs later, so that the LP UCI of LP PUCCH-1 is multiplexed with HP PUCCH-4.

FIG. 13 illustrates a scenario where a long duration LP PUCCH-1 overlaps with both a short duration HP PUCCH-2 and a short duration HP PUSCH-5. Since inter-priority multiplexing is performed between two PUCCHs of differing priorities before it is performed between a PUCCH and a PUSCH of differing priorities (i.e., step 608 occurs before step 610), the LP UCI of LP PUCCH-1 may be multiplexed within HP PUCCH-2 irrespective of the overlap with HP PUSCH-5.

Figure 14:
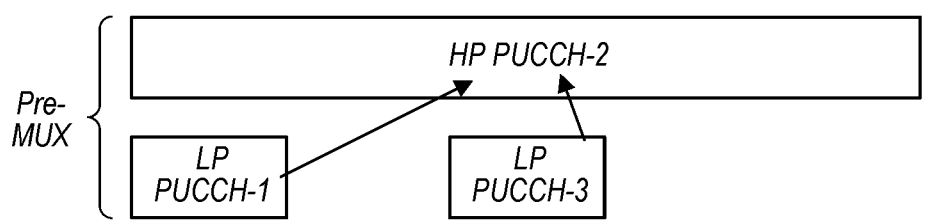

FIG. 14 illustrates a scenario where two short duration LP PUCCHs (LP PUCCH-1 and LP PUCCH-3) overlap with a long duration HP PUCCH-2. In this scenario, both the UCIs of LP PUCCH-1 and LP PUCCH-3 may be multiplexed within the HP PUCCH-2 at step 608 (e.g., if HP PUCCH-2 has sufficient available resources. If sufficient resources are not available, HP PUCCH-2 may be modified to accommodate the additional UCIs).

FIG. 15 illustrates a scenario where a short duration LP PUCCH (LP PUCCH-1) and a LP PUSCH-3 without UCI overlap with a long duration HP PUCCH-2. In this scenario, the UCI of LP PUCCH-1 may be multiplexed within the HP PUCCH-2 at step 608, followed by scheduling of multiplexing of the HP PUCCH-2 (including the LP UCI from LP PUCCH-1) in the LP PUSCH-3 at step 610.

In various embodiments, various combinations of the embodiments described above may be combined together.

Yet another exemplary embodiment may include a method, comprising: by a wireless device: performing any or all parts of the preceding examples.

Another exemplary embodiment may include a wireless device, comprising: an antenna; a radio coupled to the antenna; and a processing element operably coupled to the radio, wherein the device is configured to implement any or all parts of the preceding examples.

Still another exemplary embodiment may include an apparatus, comprising: a processing element configured to cause a wireless device to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Any of the methods described herein for operating a user equipment (UE) may be the basis of a corresponding method for operating a base station, by interpreting each message/signal X received by the UE in the DL as message/signal X transmitted by the base station, and each message/signal Y transmitted in the UL by the UE as a message/signal Y received by the base station. Moreover, a method described with respect to a base station may be interpreted as a method for a UE in a similar manner.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a processor configured to cause a user equipment (UE) to:
establish communication with a base station;
determine whether to multiplex first uplink control information (UCI) of a first physical uplink control channel (PUCCH) having a first physical layer priority, wherein, in the determining whether to multiplex the first UCI, the processor is configured to cause the UE to:
identify whether one or more timing resources of the first PUCCH overlap with one or more timing resources of a first physical uplink shared channel (PUSCH) having the first physical layer priority,
subsequent to identifying whether the one or more timing resources of the first PUCCH overlap with the one or more timing resources of the first PUSCH, identify whether the one or more timing resources of the first PUCCH overlap with one or more timing resources of a second PUCCH having a second physical layer priority different from the first physical layer priority, and
subsequent to identifying whether the one or more timing resources of the first PUCCH overlap with the one or more timing resources of the second PUCCH, identify whether the one or more timing resources of the first PUCCH overlap with one or more timing resources of a second PUSCH having a third physical layer priority; and
multiplex the first UCI based on the determination whether to multiplex the first UCI, and
transmit the multiplexed first UCI to the base station.

2. The apparatus of claim 1,
wherein in multiplexing the first UCI, the processor is configured to cause the UE to perform one or more of:
multiplexing the first UCI within the first PUSCH;
multiplexing the first UCI with the second UCI; or
multiplexing the first UCI within the second PUSCH.

3. The apparatus of claim 1,
wherein the first physical layer priority comprises a low priority and the second and third physical layer priorities comprise a high priority, or
wherein the first physical layer priority comprises the high priority and the second and third physical layer priorities comprise the low priority.

4. The apparatus of claim 3,
wherein the low priority is associated with enhanced mobile broadband (eMBB) communications, and
wherein the high priority is associated with ultra-reliable low-latency communications (URLLC).

5. The apparatus of claim 1,
wherein multiplexing the first UCI comprises multiplexing the first UCI with the second UCI,
wherein multiplexing the first UCI with the second UCI comprises multiplexing the first UCI and the second UCI within a third PUCCH, wherein the third PUCCH comprises at least a subset of timing resources of the second PUCCH, physical resource blocks (PRBs) of the second PUCCH, and one or more additional PRBs that are not comprised within the second PUCCH.

6. The apparatus of claim 1,
wherein multiplexing the first UCI comprises multiplexing the first UCI with the second UCI within the second PUCCH.

7. The apparatus of claim 1,
wherein the processor is further configured to cause the UE to:
transmit configuration information to the base station indicating that the UE supports simultaneous PUCCH/PUSCH transmission;
configure simultaneous PUCCH/PUSCH transmission with the base station;
wherein the multiplexing for the first UCI comprises multiplexing the first UCI within the first or second PUSCH, wherein component carriers of the first or second PUSCH are selected for multiplexing that occur within a same band as component carriers of the first PUCCH.

8. The apparatus of claim 1,
wherein the processor is further configured to cause the UE to:
transmit configuration information to the base station indicating that the UE supports simultaneous PUCCH/PUSCH transmission;
configure simultaneous PUCCH/PUSCH transmission with the base station;
wherein the multiplexing for the first UCI comprises multiplexing the first UCI within the first or second PUSCH, wherein any component carriers of the first or second PUSCH are selected for multiplexing the first UCI.

9. The apparatus of claim 1,
wherein the UE has not configured simultaneous PUCCH/PUSCH transmission with the base station, and
wherein the multiplexing for the first UCI comprises multiplexing the first UCI within the first or second PUSCH, wherein any component carriers of the first or second PUSCH are selected for multiplexing the first UCI.

10. The apparatus of claim 1,
wherein multiplexing the first UCI comprises:
multiplexing the first UCI and the second UCI within the second PUCCH; and
multiplexing the second PUCCH within the second PUSCH.

11. The apparatus of claim 10,
wherein the first and third physical layer priorities comprise a low priority and the second physical layer priority comprises a high priority, or
wherein the first and third physical layer priorities comprise the high priority and the second physical layer priority comprises the low priority.

12. The apparatus of claim 1,
wherein identifying whether the one or more timing resources of the first PUCCH overlap with the one or more timing resources of the second PUCCH comprises scanning for overlap from earlier PUCCHs having the second physical layer priority to later PUCCHs having the second physical layer priority.

13. The apparatus of claim 1,
wherein the first UCI comprises one or more of:
a hybrid automatic repeat request (HARQ) acknowledgment (ACK) or negative acknowledgment (NACK) message;
a scheduling request (SR); or
channel state information (CSI).

14. The apparatus of claim 1,
wherein establishing communication with the base station comprises receiving resource grants for one or more of the first PUCCH, the first PUSCH, the second PUCCH, and the second PUSCH,
wherein identifying whether the one or more timing resources of the first PUCCH overlap with the one or more timing resources of the first PUSCH, the second PUCCH, and the second PUSCH is performed based on the resource grants received from the base station.

15. The apparatus of claim 1,
wherein the processor is further configured to cause the UE to:
prior to identifying whether the one or more timing resources of the first PUCCH overlap with the one or more timing resources of the first PUSCH, identify whether the one or more timing resources of the first PUCCH overlap with one or more other PUCCHs having the first physical layer priority,
wherein multiplexing the first UCI comprises multiplexing the first UCI within one or more of the other PUCCHs having the first physical layer priority based at least in part on identifying that the one or more timing resources of the first PUCCH overlap with the one or more other PUCCHs having the first physical layer priority.

16. A user equipment (UE), comprising:
a radio; and
a processor operably connected to the radio and configured to cause the UE to:
establish communication with a base station;
determine whether to multiplex first uplink control information (UCI) of a first physical uplink control channel (PUCCH) having a first physical layer priority, wherein, in the determining whether to multiplex the first UCI, the UE is configured to:
identify whether one or more timing resources of the first PUCCH overlap with one or more timing resources of a first physical uplink shared channel (PUSCH) having the first physical layer priority,
subsequent to identifying whether the one or more timing resources of the first PUCCH overlap with the one or more timing resources of the first PUSCH, identify whether the one or more timing resources of the first PUCCH overlap with one or more timing resources of a second PUCCH having a second physical layer priority different from the first physical layer priority, and
subsequent to identifying whether the one or more timing resources of the first PUCCH overlap with the one or more timing resources of the second PUCCH, identify whether the one or more timing resources of the first PUCCH overlap with one or more timing resources of a second PUSCH having a third physical layer priority; and multiplex the first UCI based on the determination whether to multiplex the first UCI, and transmit the multiplexed first UCI to the base station.

17. The UE of claim 16, wherein multiplexing the first UCI comprises one or more of:

multiplexing the first UCI within the first PUSCH;

multiplexing the first UCI with the second UCI; or multiplexing the first UCI within the second PUSCH.

18. The UE of claim 16, wherein the first physical layer priority comprises a low priority and the second and third physical layer priorities comprise a high priority, or wherein the first physical layer priority comprises the high priority and the second and third physical layer priorities comprise the low priority, wherein the low priority is associated with enhanced mobile broadband (eMBB) communications, and wherein the high priority is associated with ultra-reliable low-latency communications (URLLC).

19. A method for operating a user equipment (UE), the method comprising:

establishing communication with a base station;

determining whether to multiplex first uplink control information (UCI) of a first physical uplink control channel (PUCCH) having a first physical layer priority, wherein said determining comprises:

identifying whether one or more timing resources of the first PUCCH overlap with one or more timing resources of a first physical uplink shared channel (PUSCH) having the first physical layer priority, subsequent to identifying whether the one or more timing resources of the first PUCCH overlap with the one or more timing resources of the first PUSCH, identifying whether the one or more timing resources of the first PUCCH overlap with one or more timing resources of a second PUCCH having a second physical layer priority different from the first physical layer priority, and subsequent to identifying whether the one or more timing resources of the first PUCCH overlap with the one or more timing resources of the second PUCCH, identifying whether the one or more timing resources of the first PUCCH overlap with one or more timing resources of a second PUSCH having a third physical layer priority; and multiplexing the first UCI based on the determination whether to multiplex the first UCI, and transmitting the multiplexed first UCI to the base station.

20. The method of claim 19, wherein multiplexing the first UCI comprises multiplexing the first UCI with the second UCI, wherein multiplexing the first UCI with the second UCI comprises multiplexing the first UCI and the second UCI within a third PUCCH, wherein the third PUCCH comprises at least a subset of timing resources of the second PUCCH, physical resource blocks (PRBs) of the second PUCCH, and one or more additional PRBs that are not comprised within the second PUCCH.

* * * * *